(12) United States Patent
Lee (10) Patent No.: US 8,968,892 B2
(45) Date of Patent: Mar. 3, 2015

(54) BATTERY PACK

(75) Inventor: Jong-Min Lee, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 662 days.

(21) Appl. No.: 13/243,846

(22) Filed: Sep. 23, 2011

(65) Prior Publication Data

US 2012/0129013 A1    May 24, 2012

(30) Foreign Application Priority Data

Nov. 23, 2010 (KR) .................. 10-2010-0116856

(51) Int. Cl.
*H01M 14/00* (2006.01)
*H01M 10/42* (2006.01)
*H01M 10/48* (2006.01)

(52) U.S. Cl.
CPC ........ *H01M 10/4207* (2013.01); *H01M 10/425* (2013.01); *H01M 10/486* (2013.01); *H01M 2200/00* (2013.01)
USPC .......................................................... 429/7

(58) Field of Classification Search
CPC ............ H01M 10/42; H01M 10/4207; H01M 10/486; H01M 10/425; H01M 2200/00; Y02E 60/12
USPC .......................................................... 429/7
See application file for complete search history.

(56) References Cited

U.S. PATENT DOCUMENTS

| 2006/0093896 A1* | 5/2006 | Hong et al. ........... 429/61 |
| 2007/0296541 A1* | 12/2007 | Garcia et al. ........ 338/22 R |
| 2008/0280192 A1 | 11/2008 | Drozdz et al. |
| 2009/0280401 A1 | 11/2009 | Kim |
| 2009/0316752 A1 | 12/2009 | Kawase et al. |
| 2010/0297482 A1 | 11/2010 | Yoon et al. |

FOREIGN PATENT DOCUMENTS

| JP | 2002025633 A | * | 1/2002 | ............ H01M 10/48 |
| JP | 2007-141782 | | 6/2007 | |
| JP | 2007294281 A | * | 11/2007 | |
| KR | 1998038177 | | 8/1998 | |
| KR | 20090097177 | | 9/2009 | |
| KR | 1020100037802 A | | 4/2010 | |

OTHER PUBLICATIONS

Korean Office Action issued by KIPO on Apr. 25, 2012 in connection with Korean Patent Application Serial No. KR 10-2010-0116856 and Request for Entry of the Accompanying Office Action attached herewith.

Korean Office Action dated Nov. 26, 2012 in connection with Korean Patent Application No. 10-2010-0116856 and Request for Entry of the Accompanying Office Action attached herewith.

* cited by examiner

*Primary Examiner* — Gary Harris
(74) *Attorney, Agent, or Firm* — Robert E. Bushnell, Esq.

(57) ABSTRACT

A battery pack includes a plurality of bare cells electrically connected in series or parallel to one another, and a protection circuit module provided with a thermistor. In the battery pack, the protection circuit module is electrically connected to the bare cells, and the thermistor is provided to be parallel in the length direction of the protection circuit module between the bare cells and the protection circuit module so as to measure a variable resistance by sensing a temperature of the bare cells and to transfer the measured resistance as an electrical signal to the protection circuit module.

10 Claims, 5 Drawing Sheets

BATTERY PACK

CLAIM OF PRIORITY

This application makes reference to, incorporates into this specification the entire contents of, and claims all benefits accruing under 35 U.S.C. §119 from an application earlier filed in the Korean Intellectual Property Office filed on Nov. 23, 2010 and there duly assigned Serial No. 10-2010-0116856.

BACKGROUND OF THE INVENTION

1. Field of the Invention

An aspect of the present invention relates to a battery pack, and more particularly, to a battery pack having a protection circuit module provided with a plurality of bare cells and a thermistor.

2. Description of the Related Art

With the rapid development of electronic and communication industries, mobile electronic devices have recently been employed by various applications. Secondary batteries are widely used as power sources of the mobile electronic devices because the secondary batteries have economical efficiency. The secondary batteries may also be used not only in cellular phones or notebook computers but also in medium- and large-sized apparatuses such as machine tools, electric bicycles and automobiles, which require high output and high power. Since a high-output and high-voltage power source is required in such apparatuses, a battery pack obtained by connecting a plurality of secondary batteries in series or parallel to one another is used as a power source.

As described above, the battery pack having the plurality of secondary batteries further includes various protection devices for the purpose of safety. A thermistor is a kind of protection device and is a component that measures temperature. When the temperature rapidly increases before the heat generation or firing of the battery pack, the thermistor may sense the increased temperature of a bare cell and transfer the sensed temperature to a protection circuit module so as to cut off electric current.

SUMMARY OF THE INVENTION

The present invention provides a battery pack having a protection circuit module provided with a thermistor firmly attached to the protection circuit module.

The present invention also provides a battery pack in which a protection circuit module having bare cells and a thermistor are housed by a case, the thermistor is not influenced by the case.

The present invention also provides a battery pack having improved accuracy of sensing the temperature of bare cells by modifying the mounting structure of a thermistor provided to a protection circuit board.

In accordance with an aspect of the present invention, a battery pack may include a plurality of bare cells electrically connected in series or parallel to one another; and a protection circuit module provided with a thermistor. The protection circuit module is electrically connected to the bare cells, and the thermistor is provided to be parallel in the length direction of the protection circuit module between the bare cells and the protection circuit module so as to sense a temperature of the bare cells by measuring a variable resistance and to transfer the measured resistance as an electrical signal to the protection circuit module.

The thermistor may include a temperature sensing element that senses the temperature of the bare cells, a terminal portion that transfers the sensed temperature to the protection circuit module, and a support portion that connects the temperature sensing element and the terminal portion.

The thermistor may further include an insulating film that covers the temperature sensing element and the support portion.

The temperature sensing element and the support portion in the thermistor may be provided to be parallel to the bare cells between the bare cells and the protection circuit module, and the terminal portion of the thermistor may be electrically connected to the protection circuit module.

The protection circuit module may be formed in the shape of a plate having first and second faces which are disposed opposite to each other, and the first and second faces of the protection circuit module may be provided to be parallel to the length direction of the bare cells.

The terminal portion of the thermistor may include first and second terminals.

The first terminal of the thermistor may be provided to the first face of the protection circuit module, and the second terminal of the thermistor may be provided to the second face of the protection circuit module.

A solder may be further included in each of the first and second terminals of the thermistor respectively provided to the first and second faces of the protection circuit module.

The protection circuit module may be formed in the shape of a plate having first and second faces, and the first and second faces of the protection circuit module may be provided to face the length direction of the bare cells.

The terminal portion of the thermistor may be provided to the same face of the first or second face of the protection circuit module.

The protection circuit module may further include at least one thermistor through-portion.

The terminal portion of the thermistor may pass through the thermistor through-portion of the protection circuit module so that the thermistor and the protection module are electrically connected to each other.

A solder may be further included in the terminal portion provided to pass through the thermistor through-portion.

The thermistor may be provided to come in physical contact with the bare cell.

The thermistor may further include an adhesive member at a portion that comes in contact with the bare cell.

The adhesive member may be a silicon or double-faced tape.

The battery pack may further include a case that houses the bare cells and the protection circuit module. The thermistor may be spaced apart from the case.

As described above, according to the principles of the present invention, it is possible to provide a battery pack having a protection circuit module provided with a thermistor firmly attached to the protection circuit module.

Also, it is possible to provide a battery pack in which when housing a protection circuit module equipped with a thermistor and bare cells by a battery case, the operation and performance of the thermistor is not influenced by the battery case.

Also, it is possible to provide a battery pack that provides an improved accuracy of sensing the temperature of the bare cells by modifying the mounting structure for a thermistor incorporated into a protection circuit board.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, embodiments according to the present invention will be described in detail with reference with the accompanying drawings.

Embodiment 1

Hereinafter, an embodiment of the present invention will be described with reference to FIGS. 1 to 3.

Figure 1:
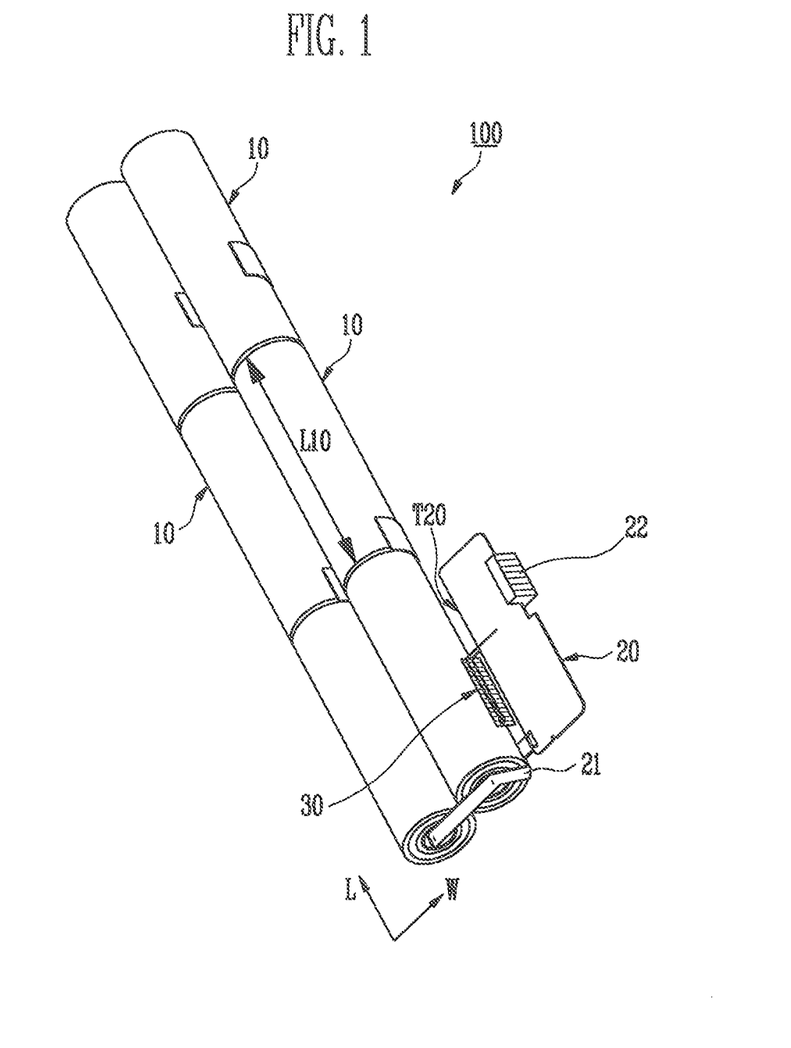
FIG. 1 is an oblique view of a core pack constructed as an embodiment of the present invention.

FIG. 1 is an oblique view of a core pack constructed as an embodiment of the present invention. FIG. 2 is a plan view of a thermistor. FIG. 3 is an oblique view showing the thermistor while connected to a protection circuit module.

In the present invention, a core pack is formed by attaching a protection circuit module to bare cells, and the core pack refers to a process before the core pack is cased and housed by a case. A battery pack is formed by casing the core pack by using the case to cover the core pack.

Referring to FIG. 1, the core pack 100 constructed as this embodiment includes a plurality of bare cells 10 connected in series or parallel to one another, and a protection circuit module 20 provided with a thermistor 30. In the core pack 100, the protection circuit module 20 is electrically connected to the bare cells 10, and the thermistor 30 is provided to be parallel in the length direction L of the protection circuit module 20 between the bare cells 10 and the protection circuit module 20. The thermistor 30 measures a variable resistance by sensing the temperature of the bare cells 10, and transfers the measured resistance as an electrical signal to the protection circuit module 20. The indicator W is the width direction of the protection circuit module 20 and the width direction W is perpendicular to the length direction L of the protection circuit module 20.

The bare cell 10 is configured as a battery case in which an electrode assembly and an electrolyte are accommodated in operational residence together. Here, the electrode assembly may be formed by winding or stacking a positive electrode plate, a negative electrode plate and a separator interposed between the positive electrode plate and the negative electrode plate. The electrode assembly supplies electric energy to the exterior of the bare cell 10 through an electrochemical reaction with the electrolyte. For example, the bare cell 10 may be a lithium secondary battery, such as a lithium ion or a lithium polymer.

The protection circuit module 20 may include a printed circuit board, a protection circuit device, and other constituent elements. One or more devices capable of connecting the bare cell 10 to the exterior may be mounted on the printed circuit board.

The protection circuit module 20 may also include an electrode tab 21 and a separate connector 22. For example, the electrode tab 21 may be formed of nickel, copper or the like, and the protection circuit module 20 is electrically connected to the bare cells 10 by the electrode tab 21. The connector 22 is a portion fastened to an external electronic device (not shown), and the protection circuit module 20 may be electrically connected to the external electronic device by the connector 22.

Figure 2:
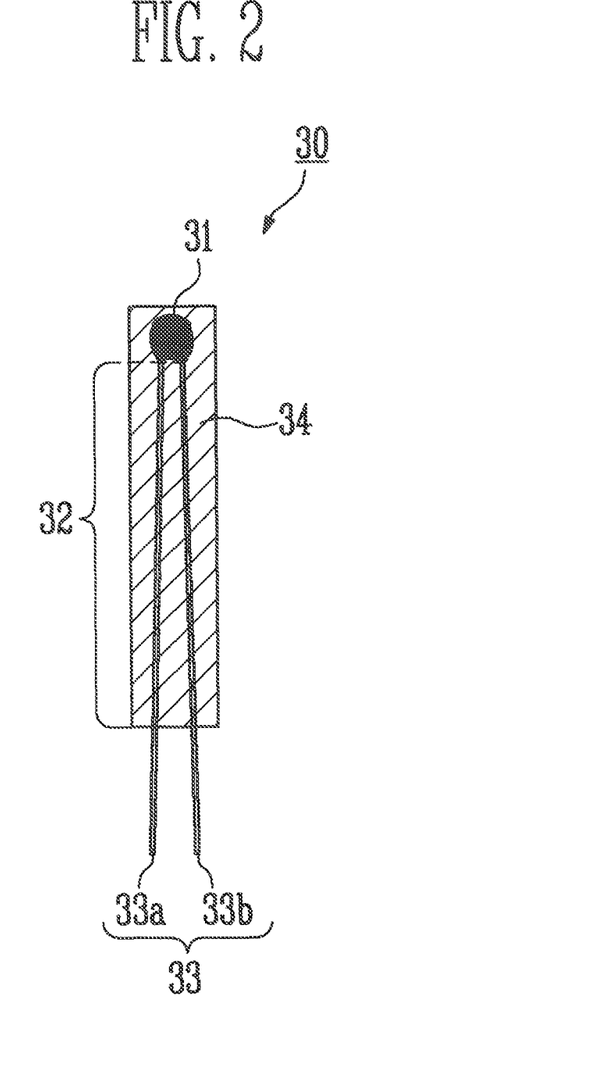
FIG. 2 is a plan view of a thermistor.

Referring to FIG. 2, in this embodiment, the thermistor 30 is a device that senses the temperature of the bare cells 10 and transfers the sensed temperature to the protection circuit module 20. The thermistor includes a temperature sensing element 31, a support portion 32 and a terminal portion 33.

The temperature sensing element 31 is a portion that senses the temperature of the bare cells 10. For example, the temperature sensing element 31 has a characteristic in which resistance is changed by ambient temperature. The temperature sensing element 31 may be provided to have a positive or negative temperature coefficient characteristic for example.

A pair of lead lines may be connected to the temperature sensing element 31. In the thermistor 30, the temperature sensing element 31 and the pair of lead lines 33a and 33b that form terminal portion 33 may be covered by an insulating film 34. In this instance, the pair of lead lines may have lengths that are roughly similar to each other, and both of the distal terminal ends of the lead lines 33a and 33b may be exposed to the exterior environment by the insulating film 34. The insulating film 34 may be made of an electrical and thermal insulating material.

As described above, in this embodiment, the portion of the lead lines 33a and 33b, covered by the insulating film 34, is referred to as a support portion 32, and both the ends of the lead lines 33a and 33b, exposed to the exterior by the relative shortness of the insulating film 34, are collectively referred to as a terminal portion 33. The terminal portion 33 transfers the temperature of the bare cells 10, sensed by the temperature sensing element 31, to the protection circuit module 20, and the support portion 32 connects the temperature sensing element 31 and the terminal portion 33.

Figure 3:
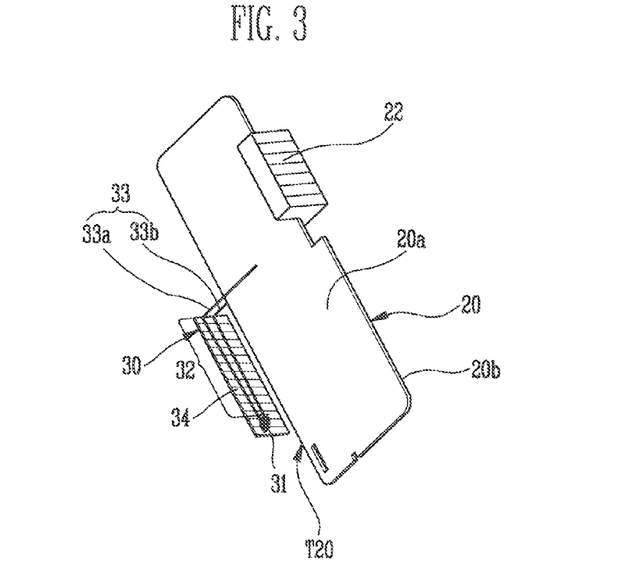
FIG. 3 is an oblique view showing an arrangement for a thermistor that is connected to a protection circuit module.

Referring now to FIG. 3, the temperature sensing element 31 and the support portion 32 for the thermistor 30 may be positioned with its length aligned in parallel to the bare cells 10 between the bare cells 10 and the protection circuit module 20. In this instance, the terminal portion 33 of the thermistor 30 may be electrically and physically connected to the protection circuit module 20.

Specifically, the protection circuit module 20 is formed in the shape of a thin plate having first and second faces 20a and 20b respectively formed by the obverse and rear sides of the major surfaces. The protection circuit module 20 is formed so that a thickness portion T20 connects the first and second faces 20a and 20b and the thickness portion T20 faces a cylindrical side of the bare cells 10. That is, the first and second faces 20a and 20b of the protection circuit module 20 are aligned in geometric parallel with respect to the direction L10, the length of core pack 100 of the bare cells 10. In one embodiment, the first and second faces 20a and 20b may be referred to major surfaces (larger surfaces), and the thickness portion T20 may be referred to one of minor surfaces (smaller surfaces) which connect the first and second faces 20a and 20b.

The terminal portion 33 of the thermistor 30 may include a first terminal 33a and a second terminal 33b. In this instance, the first terminal 33a of the thermistor 30 is extended across the first face 20a of the protection circuit module 20, and the second terminal 33b of the thermistor 30 is extended across the second face 20b of the protection circuit module 20.

As shown in FIG. 3, the terminal portions 33 of the thermistor 30 may be provided so that the first and second terminals 33a and 33b are respectively put on different ones of the first and second faces 20a and 20b of the protection module 20. The thermistor 30 configured as described above has a terminal portion 33 roughly bent perpendicularly, and the temperature sensing element 31 and the support portion 32 are provided in geometric parallel to the geometric planes defined by the major surface areas of first and second faces 20a, 20b of the protection circuit module 20. Thus, the temperature sensing element 31 and the support portion 32 are provided in parallel to the side in the length or longer direction of the bare cells 10 between the protection circuit module 20 and the bare cells 10.

In one embodiment, the first terminal 33a of the thermistor 30 may be in direct contact with the first face 20a, and the second terminal 33b of the thermistor 30 may be in direct contact with the second face 20b.

In one embodiment, the temperature sensing element 31 and the support portion 32 may be spaced apart from the bare cells 10.

A solder may be further included in each of the first and second terminals 33a and 33b of the thermistor 30, respectively provided to the first and second faces 20a and 20b of the protection circuit module 20, so that the first and second terminals 33a and 33b are firmly joined with the protection circuit module 20.

As described above, the thermistor constructed as this embodiment may be provided to come in contact with the bare cell 10. Specifically, the temperature sensing element 31 of the thermistor 30 is a portion that directly senses the temperature of the bare cells 10. The temperature sensing element 31 transfers the sensed temperature to the protection circuit module 20 by the terminal portion 33 connected to the temperature sensing element 31 through the support portion 32. Therefore, in order to precisely sense the temperature of the bare cells 10, the thermistor 30 may be provided to come in physical contact with the bare cell 10. In one embodiment, the thermistor 30 may be in direct physical contact with the bare cells 10. In one embodiment, the temperature sensing element 31 of the thermistor 30 may be in direct physical contact with the bare cells 10. In one embodiment, one major (larger) surface of the thermistor 30 may be direct contact with the bare cells 10.

An adhesive member may further included in the bare cell 10 and the thermistor 30. The adhesive member is used to firmly perform the adhesion between the bare cell 10 and the thermistor 30, and may include a silicon or double-faced tape for example.

Embodiment 2

Hereinafter, another embodiment of the present invention will be described with reference to FIGS. 4 and 5.

Figure 4:
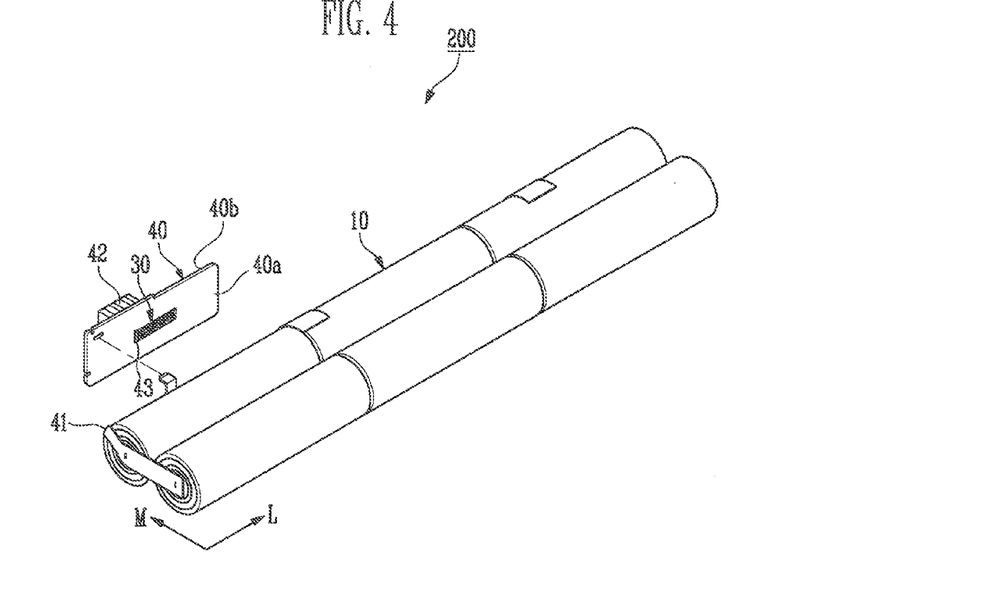
FIG. 4 is an oblique view of a core pack constructed with another embodiment of the present invention.

FIG. 4 is an oblique view of a core pack constructed with another embodiment of the present invention. FIG. 5 is an oblique view showing a state that a thermistor is connected to a protection circuit module.

The core pack 200 constructed with this embodiment includes a plurality of bare cells 10 connected in series or parallel to one another, and a protection circuit module 40 having a thermistor 30.

In the core pack 200, the protection circuit module 40 is electrically connected to the bare cells 10, and the thermistor 30 is provided to be parallel in the length direction L of the protection circuit module 40 between the bare cells 10 and the protection circuit module 40. The thermistor 30 senses the temperature of the bare cells 10 and transfers the sense temperature to the protection circuit module 40. Since the core pack 200 constructed with this embodiment is similar to the Embodiment 1 except the following description, its detailed description will be omitted.

Referring to FIG. 4, the protection circuit module 40 according to this embodiment is formed in the shape of a thin plate having first and second faces 40a and 40b. The first and second faces 40a and 40b of the protection circuit module 40 are provided to face the length direction of the bare cells 10. The protection circuit module 40 may further include an electrode tab 41 electrically connected to the bare cells 10, and a separate connector 42 that connects the protection circuit module 40 to an external electronic device (not shown).

Figure 5:
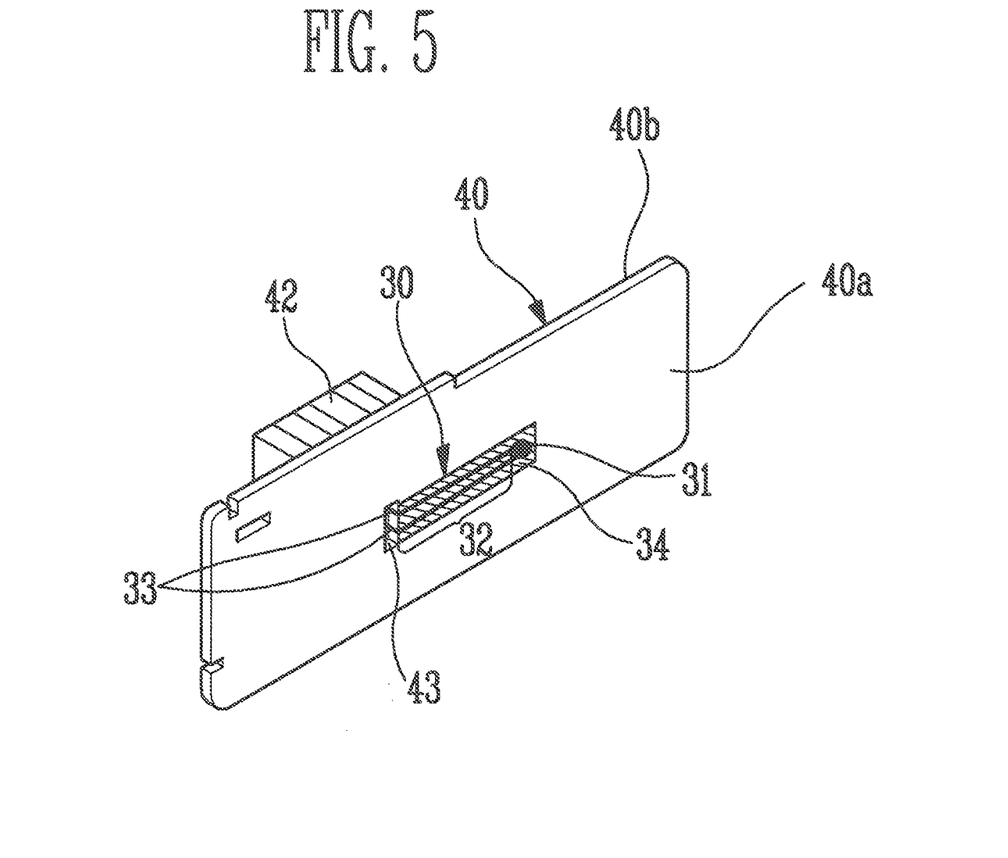
FIG. 5 is an oblique view showing an arrangement for a thermistor that is connected to a protection circuit module.

Referring to FIG. 5, the thermistor 30 includes a temperature sensing element 31 that senses the temperature of the bare cells 10, a terminal portion 33 that transfers the sensed temperature to the protection circuit module 40, and a support portion 32 that connects the temperature sensing element 31 to the terminal portion 33. At this time, the terminal portion 33 of the thermistor 30 may be provided to the same face of the first or second face 40a or 40b in the protection circuit module 40.

The protection circuit module 40 may further include at least one thermistor through-portion 43. The thermistor through portion 43 is a portion through which the terminal portion 33 of the thermistor 30 passes. The terminal to portion 33 of the thermistor 30 passes through the thermistor through-portion 43, so that the thermistor 30 and the protection circuit module 40 can be connected to each other. In one embodiment, the thermistor through portion 43 may be a through hole perforating the protection circuit module 40.

In this instance, a solder may be further included in the terminal is portion 33 provided to the thermistor through-portion 43 of the protection circuit module 40. The solder is used so that the protection circuit module 40 and the thermistor 30 are more firmly joined with each other.

In this embodiment, the temperature sensing element 31 and the support portion 32 in the thermistor 30 are provided in parallel to the bare cells 10 between the bare cells 10 and the protection circuit module 40. The terminal portion 33 of the thermistor 30 may be roughly perpendicularly bent to be connected to the protection circuit module 40.

In one embodiment, the thermistor 30 may be in direct physical contact with the bare cells 10. In one embodiment, the temperature sensing element 31 of the thermistor 30 may be in direct physical contact with the bare cells 10. In one embodiment, one major (larger) surface of the thermistor 30 may be direct contact with the bare cells 10.

Embodiment 3

Hereinafter, a battery pack having a core pack constructed with an embodiment of the present invention will be described with reference to FIGS. 6A and 6B. Although the battery pack including the core pack of the Embodiment 2 and a case for casing the core pack is described in this embodiment, the present invention is not limited thereto.

Figure 6A:
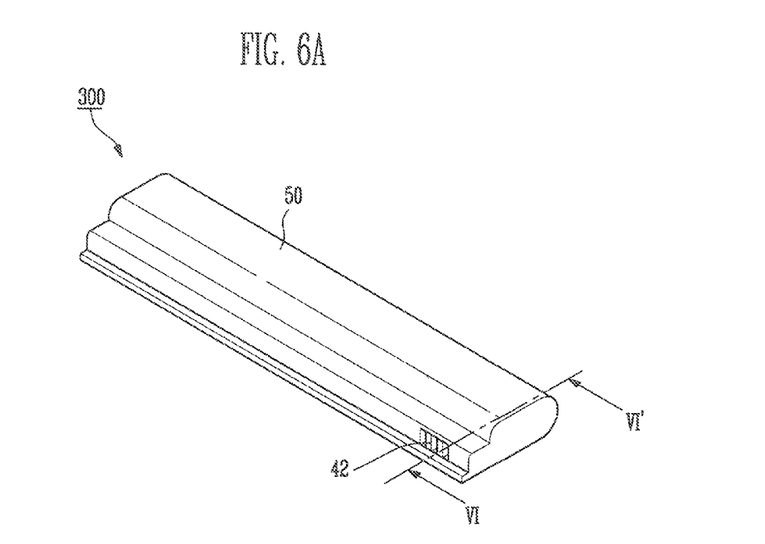
FIG. 6A is an oblique view of a battery pack having a case.

FIG. 6A is an oblique view of a battery pack having a case. FIG. 6B is a sectional view taken along line VI-VI' of FIG. 6A.

Figure 6B:
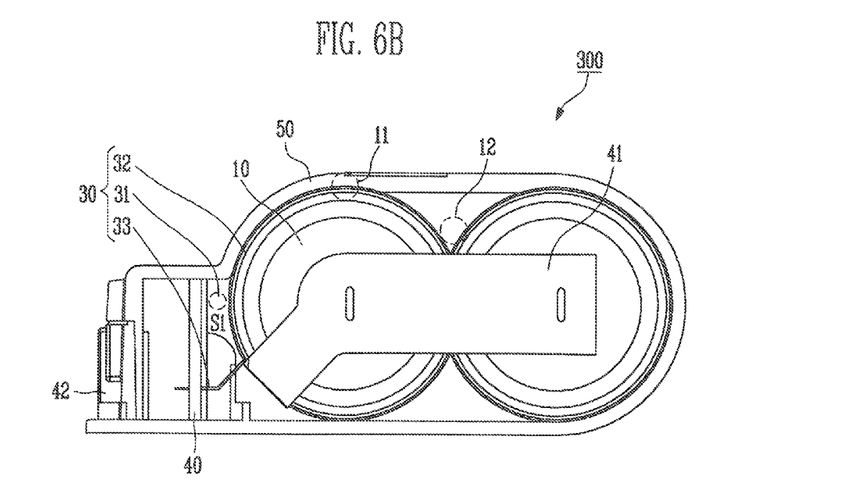
FIG. 6B is a sectional view taken along line VI-VI' of FIG. 6A.

Referring to FIGS. 6A and 6B, the battery pack constructed with this embodiment includes a plurality of bare cells 10 connected in series or parallel to one another, a protection circuit module 40 having a thermistor 30 electrically connected to the bare cells 10, and a case 50 that cases the bare cells 10 and the protection circuit module 40.

The thermistor 30 may be provided to be parallel in the length direction L of the protection circuit module 40 between the bare cells 10 and the protection circuit module 40. The thermistor 30 senses the temperature of the bare cells 10 and transfers the sensed temperature to the protection circuit module 40. In this instance, the thermistor 30 may be provided to be spaced apart from the case 50.

The thermistor 30 is generally electrically connected to the protection circuit module 40 to be roughly perpendicular to the length direction of the bare cells 10. That is, the terminal portion 33 of the thermistor 30 is connected to be perpendicular to the protection circuit module 40. The thermistor 30 connected as described above is disposed to be perpendicular to the length direction of the bare cells 10 without bending. Thus, the support portion 32 of the thermistor 30 covers a portion of the bare cell 10 along the bare cell 10, and a temperature sensing element 31 of the thermistor 30 may be positioned at a first or second portion 11 or 12 of the bare cell 10.

When the bare cells 10 are cased by the case 50, the first portion 11 of the bare cell 10 is provided so that the case 50 is adhered almost closely to the bare cell 10, and therefore, it is not sufficient to secure a space in which the temperature sensing element 31 of the thermistor 30. Accordingly, when external impacts are applied to the battery pack 300, there may occur a defect that the thermistor 30 may be cut, that the temperature sensing element 31 may be broken, or the like.

In order to avoid interference between the thermistor 30 and the case 50, the temperature sensing element 31 of the thermistor 30 may be provided at the second portion 12 of the bare cell 10.

The second portion 12 of the bare cell 10 is a space that may be provided when the side of the bare cell 10 has a roughly round shape. The second portion 12 may be disposed within a space between two adjacent bare cells 10. As described above, the temperature sensing element 31 of the thermistor 30 is generally provided at the second portion 12 in order to avoid the interference between the thermistor 30 and the case 50. In a case where the thermistor 30 is provided as described above, however, it is difficult to adhere the temperature sensing element 31 of the thermistor 30 closely to the bare cell 10, and therefore, the accuracy of temperature sensing is degraded.

On the other hand, in the battery pack 300 according to this embodiment, the thermistor 30 may be provided in the space S1 between the protection circuit module 40 and the bare cells 10. Thus, the thermistor 30 is provided to be spaced apart from the case 50, so that there is no influence of the interference by the case 50. Since the thermistor 30, particularly the temperature sensing element 31 may be firmly adhered closely to the bare cell 10, the accuracy of temperature sensing may be improved.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
a plurality of bare cells electrically connected in series or parallel to one another; and
a protection circuit module provided with a thermistor, the thermistor disposed between the bare cells and the protection circuit module, the thermistor comprising:
a first portion disposed parallel to a lengthwise direction of the bare cells, the first portion comprising a temperature sensing element and a pair of lead lines extending substantially parallel to the lengthwise direction of the bare cells and electrically connected to the temperature sensing element, and
a second portion bent to connect the first portion to the protection circuit module,
wherein the first portion faces directly to the protection circuit module,
wherein the temperature sensing element senses the temperature of the bare cells, the second portion transfers the sensed temperature to the protection circuit module, and the pair of lead lines connects the temperature sensing element and the second portion,
wherein the second portion of the thermistor is electrically connected to the protection circuit module, and
wherein the second portion of the thermistor comprises first and second terminals,
wherein the protection circuit module is formed in a shape of a plate having first and second faces which are disposed opposite to each other, and
wherein the first terminal of the thermistor is provided to the first face of the protection circuit module, and the second terminal of the thermistor is provided to the second face of the protection circuit module.

2. The battery pack according to claim 1, wherein the first portion of the thermistor further comprises an insulating film that covers the temperature sensing element and the pair of lead lines.

3. The battery pack according to claim 1, wherein the first and second faces of the protection circuit module are provided to be parallel to the lengthwise direction of the bare cells.

4. The battery pack according to claim 1, further comprising a solder which respectively connects the first and second terminals of the thermistor respectively to the first and second faces of the protection circuit module.

5. The battery pack according to claim 1, wherein the thermistor is provided to come in physical contact with the bare cell.

6. The battery pack according to claim 5, wherein the thermistor further comprises an adhesive member at a portion that comes in physical contact with the bare cell.

7. The battery pack according to claim 6, wherein the adhesive member is a silicon or double-faced tape.

8. The battery pack according to claim 1, further comprising a case that houses the bare cells and the protection circuit module, wherein the thermistor is provided to be spaced apart from the case.

9. A battery pack, comprising:

a plurality of bare cells electrically connected in series or parallel to one another;

a protection circuit module disposed parallel to the plurality of the bare cells, the protection circuit module being electrically connected to the plurality of the bare cells; and a thermistor disposed between the protection circuit module and the bare cell, the thermistor being electrically connected to the protection circuit module, and the thermistor comprising:

a first portion disposed parallel to a lengthwise direction of the bare cells, the first portion comprising a temperature sensing element and a pair of lead lines extending substantially parallel to the lengthwise direction of the bare cells and electrically connected to the temperature sensing element, and a second portion bent to connect the first portion to the protection circuit module, wherein the first portion faces directly to the protection circuit module, wherein the temperature sensing element senses the temperature of the bare cells, the second portion transfers the sensed temperature to the protection circuit module, and the pair of lead lines connects the temperature sensing element and the second portion, wherein the second portion of the thermistor is electrically connected to the protection circuit module, and wherein the second portion of the thermistor comprises first and second terminals, wherein the protection circuit module is formed in a shape of a plate having first and second larger surfaces which are disposed opposite to each other, and wherein the first terminal of the thermistor is provided to the first face of the protection circuit module, and the second terminal of the thermistor is provided to the second face of the protection circuit module.

10. The battery pack of claim 9, wherein the protection circuit module has a plurality smaller surfaces connecting the first and second larger surfaces, one of the plurality smaller surfaces of the protection circuit module faces towards the bare cells.

* * * * *